United States Patent [19]

Modgling

[11] 3,961,520
[45] June 8, 1976

[54] APPARATUS FOR MECHANICALLY EXERCISING BOURDON TUBE GAUGE

[75] Inventor: Tommie R. Modgling, Chino, Calif.

[73] Assignee: The United States of America as represented by the Secretary of the Navy, Washington, D.C.

[22] Filed: May 27, 1975

[21] Appl. No.: 580,653

[52] U.S. Cl. .................................. 73/4 R; 73/418
[51] Int. Cl.² .................... G01L 27/00; G01L 7/04
[58] Field of Search ............ 73/1 C, 4 R, 415, 417, 73/418, 420, 432 R

[56] References Cited
UNITED STATES PATENTS 3,478,571  11/1969  Mounteer ............................ 73/4 R Primary Examiner—Donald O. Woodiel
Assistant Examiner—John S. Appleman
Attorney, Agent, or Firm—Richard S. Sciascia; Paul N. Critchlow

[57] ABSTRACT

Bourdon tubes should be exercised prior to each calibration by causing the tube to move repeatedly through its normal coiling and uncoiling arcs amounts sufficient to produce full scale deflection of the gage pointer. The exercising movements conventionally have been accomplished by applying pressure inside the tube. It has been found that these exercising movements can be accomplished with equal reliability and considerably less expense by engaging the tube end with a pivoted lever and by using a control screw for pivoting the lever.

5 Claims, 6 Drawing Figures

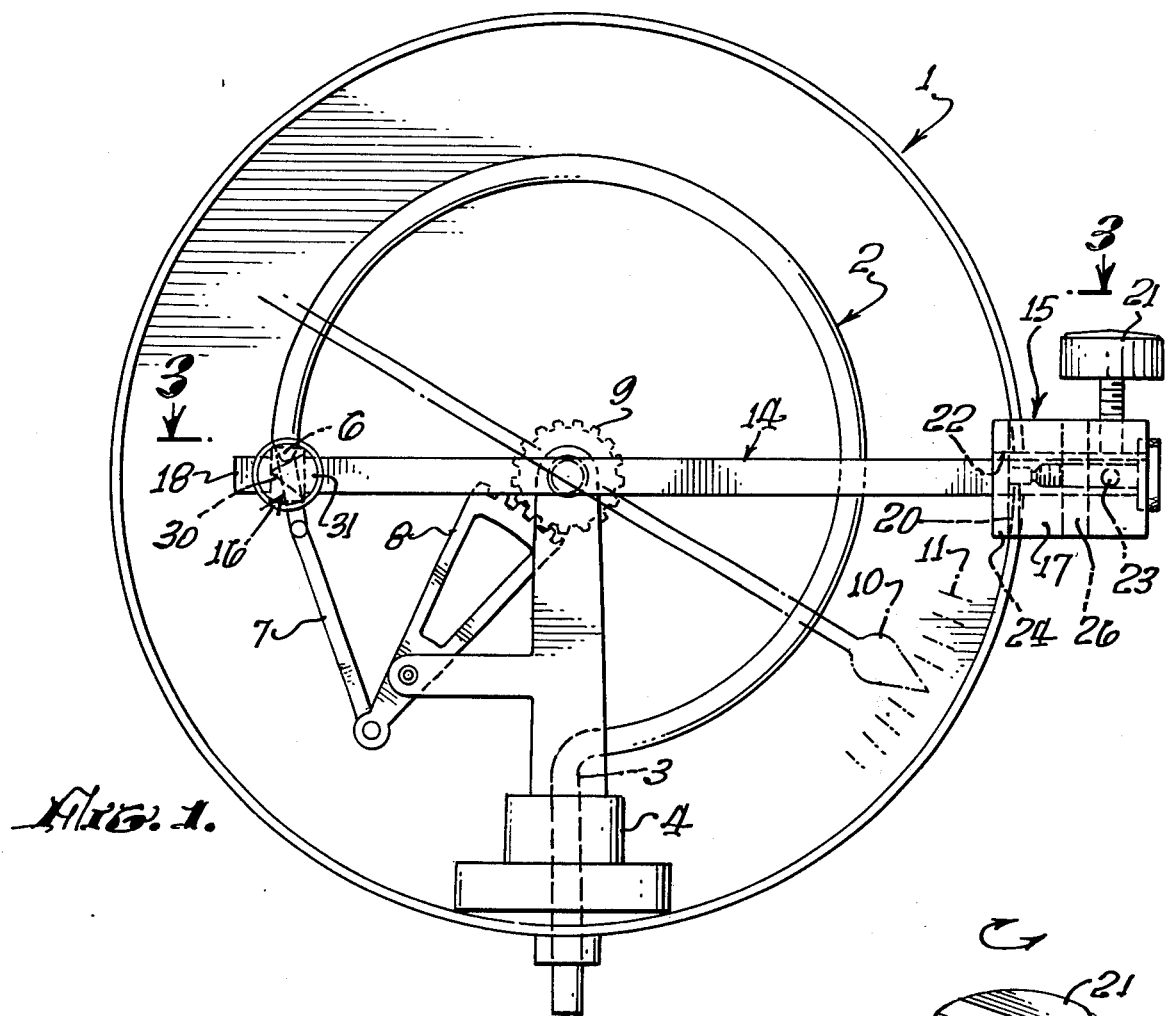
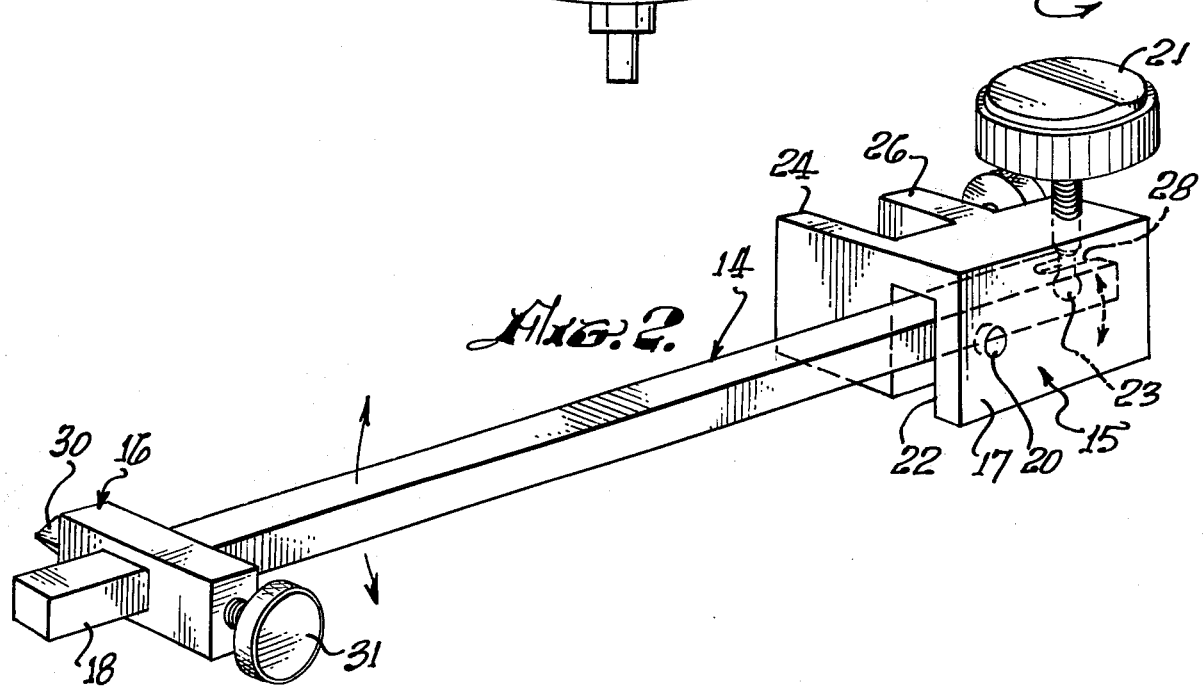

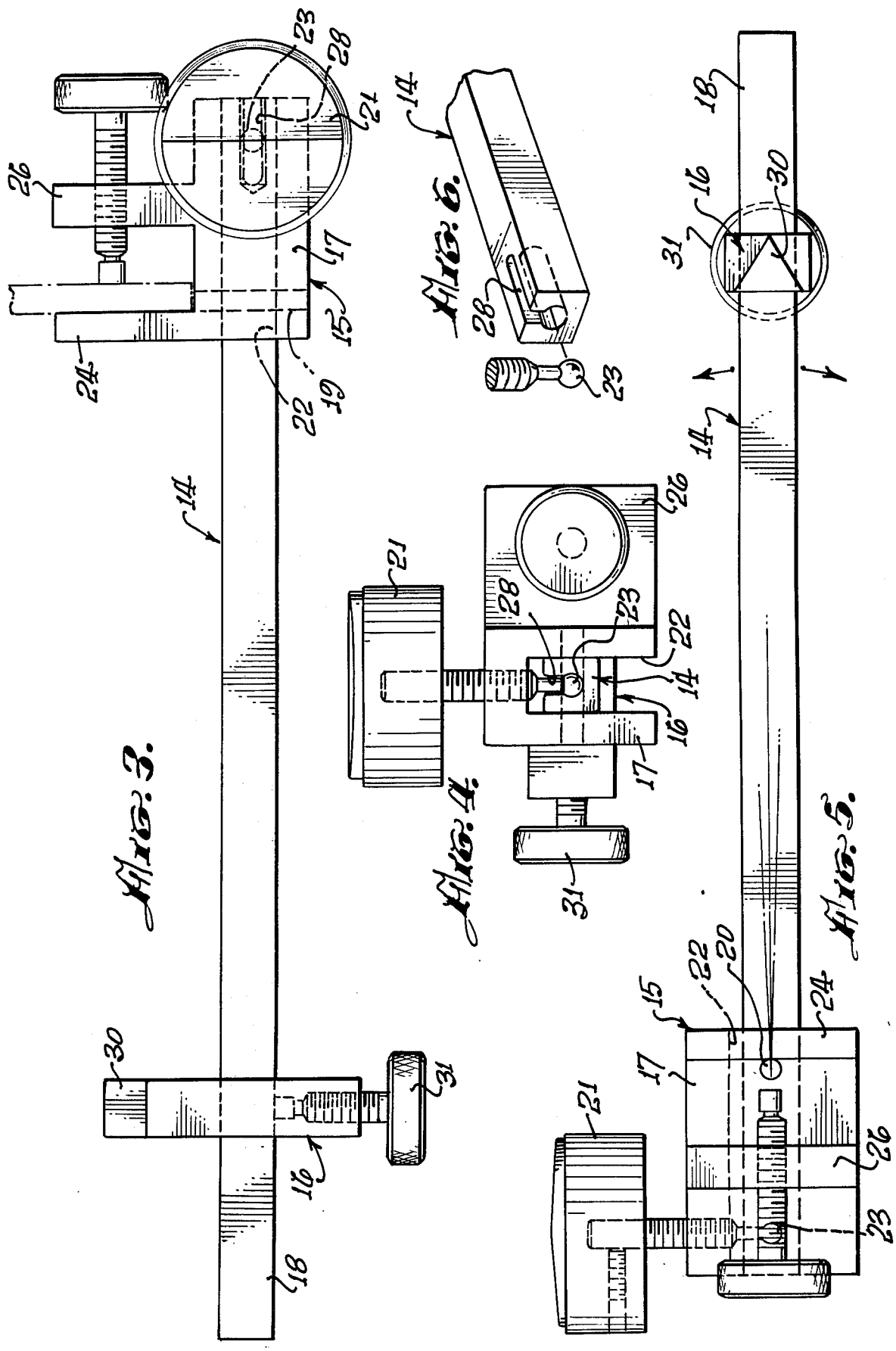

APPARATUS FOR MECHANICALLY EXERCISING BOURDON TUBE GAUGE

BACKGROUND OF THE INVENTION

The present invention relates to bourdon tube gages and, in particular, to means for exercising the coiled tubes of these gages. The tube portion of the bourdon tube usually is elliptical or flattened in cross-section and bent into a circular or somewhat coiled form. The fluid pressure to be measured is applied to the tube interior through one of its ends while the other end is sealed. A pointer and scale provide direct pressure readings. Usually, the sealed end of the tube is coupled by a link to a pivoted quadrant that is provided with teeth meshed with those of a pinion that is mounted on the pointer spindle. An increase of pressure within the tube tends to change its cross section from elliptical to circular and the tube consequently uncoils slightly to turn the pointer.

Prior to any use, it is desirable to calibrate the gages by admitting known amounts of hydraulic or pneumatic fluid to the tube interior to determine the response of the pointer. However, prior to calibration, it is equally important to conduct a so-called tube-exercising procedure in which the tube is deflected a sufficient amount to produce full scale movements of its pointer and usually each exercising operation repeats the full scale movements several times. For example, U. S. Naval activities customarily require such exercising operations prior to each calibration. The exercising operations are set forth in certain instrument calibration procedures identified as procedures 17–20 mp-01, 17–20 mp-13 and 17-mp-15.

As far as in known, exercising has been accomplished by admitting fluid pressure into the tube interior, and although such procedures have been entirely effective, they are inefficient and uneconomical. For one reason, they are unnecessarily wasteful of the gas used to produce the full scale deflections. In addition, they have proven to be unnecessarily time-consuming. For example, certain gages require the use of high-grade, dry nitrogen gasses both in the exercising and calibration procedures. Such gases are used to maintain an 'oxygen clean' condition. Each calibration and exercising procedure requires about ⅛ of a tank of the gas at a material cost per unit of over $18.00. Since the exercising operation alone requires the tube to be filled and pressured full scale at least three times, the major portion of this material expense occurs during the exercising. Further, the gas used in the exercising is bled-off and discarded so that it is entirely wasted. Other gages use a less expensive dry nitrogen but again, the expense of the gas becomes a total loss. Additionally, the man hours needed for exercising a tube by repeatedly admitting gas to the tube interior becomes a factor which can be significantly reduced if the need to admit the gas is eliminated.

Accordingly, it is a primary object of the present invention to provide a means for mechanically exercising bourdon tube gages which is equally as effective and reliable, as well as considerably less expensive, than past exercising methods.

Another object is to provide a pivotal lever arm for physically engaging and mechanically exercising the tube, the apparatus itself being simple, inexpensive and easily and quickly mounted in operative position.

BRIEF DESCRIPTION OF THE DRAWINGS

The present invention is illustrated in the accompanying drawings of which:

FIG. 1 is somewhat schematic view of a bourdon tube gage showing the present mechanical exerciser mounted in operative position on the gage;

FIG. 2 is a perspective view of the present exerciser;

FIG. 3 is a top plan view taken along line 3—3 of FIG. 1;

FIG. 4 is an outer end view of the exerciser;

FIG. 5 is a side view, and

FIG. 6 is a perspective showing a particular pivotal connection to be described.

DETAILED DESCRIPTION OF THE INVENTION

The gage illustrated in FIG. 1 is intended to be a conventional type having a housing or casing 1 containing a bourdon tube 2 which, as is known, is a hollow tube bent into a circular or coiled disposition and having an inlet end 3 soldered to a central block 4 through which hydraulic or pneumatic fluid pressure is admitted to the tube interior. Tube 2 customarily is either elliptical or flattened in cross section so that increases of pressure within the tube tend to change the cross section from elliptical to circular with the result that the tube uncoils a proportionate but slight amount. To permit pressure buildup, the tube is formed with a sealed end 6 which is coupled by suitable mechanical linkage 7 to a quadrant gear 8 which, in turn, drives a pinion 9 to produce deflections or movements of a pointer 10. A scale 11 provides pressure indices to permit direct readings of the pressure increases that produce the pointer deflections.

The present invention is directly concerned with the provision of mechanical means for exercising bourdon tube 2 prior to its calibration. This mechanical means generally is identified in FIG. 1 by numeral 13 and broadly considered, it includes an elongate lever arm 14 carried by a baseplate 15 and extending transversely of the housing into a position in which it supports sealed end 6 of the bourdon tube. Support for the end of the tube is provided by a special foot member 16 the details of which will be described subsequently. Baseplate 15 is formed to securely clamp onto housing 1, although, if necessary, the plate can be clamped to a suitable standard or other stable support. In use, the tube portions are completely enclosed within the housing 1 which normally is provided with a front wall or cover to form the enclosure. However, during the exercising procedure, the cover is removed.

Calibration, as has been stated, is conducted by admitting pressure to the tube interior and obtaining readings for fixed amounts of pressure increases. Exercising, on the other hand, is concerned primarily with the physical responses and movements of the tube. In other words, exercising is concerned directly with determining whether the uncoiling and coiling movements of the tube are smoothly continuous throughout their entire or full-scale arcuate movements. Also, the tube must be moved full scale several or more times for the purpose of assuring movement in a constant arc so that, when the tube is put into actual use, it will coil and uncoil in the precise manner for which it has been calibrated. In other words, these tubes should possess what is human as a 'memory' so that its coiling and uncoiling movements are precisely repeatable. When a tube has been out of use for a period of time, it may be necessary to re-establish this 'memory'. Also, the use of linkage 7 and the gear and pinion drive of pointer 10 may introduce some distortion which may require correction.

Mechanical exercising, such as is presently accomplished, apparently has not been considered acceptable in spite of the simplicity and savings that result. However, it has found that the mechanical exercising is equally as effective as the accepted fluid pressure exercising. This fact now has been established in many exercising procedures conducted in accordance with established procedures.

The details of the mechanical exerciser are best seen in FIGS. 2–5. As shown, arm 14 is an elongate rectangular member formed of any desired material. For descriptive purposes, it can be considered as having an outer end portion 17 and an inner end portion 18. Also, arm 14 as a pivotal member slideably received by baseplate 15 and pivotally mounted on a pivot pin 19 journaled in the plate. Pivotal movements of the arm are produced by a control screw 21 threadably mounted in a top wall of the plate and extending through the top wall into a U-shaped notch 22. Also, control screw 21 has an expanded head portion or knob 23 formed on its inner end to engage outer end 17 of pivotal arm 14 and permit pivotal movements of the arm 14 in either direction. As shown, notch 22 is sized and shaped to slideably receive the inner end of lever arm 14.

Baseplate 15 also is formed with a pair of yoke-like flanges 24 and 26 which, as best seen in FIG. 3, are spaced to receive the sidewall of housing 1. To secure the baseplate to housing 1, a second clamping screw 27 is threadably mounted in flange 26. Preferably, the flanges are spaced sufficiently to permit baseplate 15 to be secured to other supporting members.

When it is desired to mount the mechanical exerciser in its operative position, baseplate 15, which obviously is separable from lever arm 14, is firmly secured to housing 1 by tightening screw 27. Arm 14 then is slideably fitted into its baseplate notch and brought to a position in which the pivot pin openings in the baseplate align with the pivot pin opening in arm 14. Pivot pin 19 then is inserted to secure the arm. Simultaneously with the fitting together of arm 14 and baseplate 15, knob 23 of the control screw is engaged in notch 22. For this purpose, outer end 17 of lever arm 14 is provided with an inwardly extending notch 28 the shape of which is best shown in FIG. 6. Specifically the notch has a circular lower portion and a constricted upper portion. As arm 14 is slidably moved into baseplate 15, the notch receives comparably shaped portions of control screw 21. Thus, when arm 14 is pivotally secured to the baseplate, the control screw engages the baseplate.

As shown in FIG. 1, the mounted arm extends transversely of the housing into close proximity with sealed end 6 of the tube and moves the tube arcuately in response to the manual operation of control screw 21. To provide the tube contact, foot member 16 is adjusted longitudinally of the lever arm until an inclined flange or platen 30 physically contacts and supports the tube end. To permit the adjustment, foot member 16 is formed with a transverse opening through which arm 14 extends in a manner shown in FIG. 2. When platen 13 is brought into tube end contact, foot member 16 is secured in position by tightening a set screw 31. It, of course, is preferred to physically contact sealed end 6 of the tube with inclined platen 30. However, if the arrangement does not permit direct contact, the pivotal force can be applied by contacting other points. Thus, it is possible and equally as effective to contact the pivotal connection of linkage 7.

The use of the incline of portion 30 of the foot member is predicated upon the need to permit the coiled tube to uncoil in its normal arc as the tube is being pivotally exercised. In other words, it is undesirable to contact the tube in any manner that would interfere with the normal arc by exerting a constraining force.

It further will be noted that the illustrated foot member has a triangular platen provided with two inclines 30. This dual incline permits the tube to be exercised in a downwardly direction as well as the now conventional upwardly direction. Some gage arrangements require the downward directions.

As has been stated, mechanical exercising using the described arrangement has proven equally as effective as the internal pressuring procedures and the savings both in material and man-hours has been significant.

Obviously many modifications and variations of the present invention are possible in the light of the above teachings. It is therefore to be understood that within the scope of the appended claims the invention may be practiced otherwise than as specifically described.

I claim:

1. Apparatus for exercising a housed Bourdon tube gage having a coiled tube portion provided with a sealed end adapted upon variations in interior tube pressure to move arcuately in a predetermined path, said gage further being provided with a scale and with linkage means for translating said arcuate movements into scale pointer movements; said apparatus comprising:

an elongate pivotal lever arm having inner and outer ends,
   a tube-engaging platen carried by said arm near its inner end,
   a base plate pivotally supporting the outer end of said arm, said plate being adapted to be secured firmly on said gage housing in a fixed position with said pivotal arm extending inwardly toward said sealed end of the Bourdon tube, and
   manually-operable mechanical means carried by the base plate outwardly of said lever arm support for exerting pivotal pressure on said lever arm outer end,
   said platen being adjustably carried by said lever arm for enabling said platen to be moved into a tube-engaging position and said platen having an inclined engagement surface for permitting the tube to move in an unrestrained natural arc when said lever is pivotedly moved,
   whereby said tube can be exercised by pivotally moving said tube repeatedly through its full scale arc.

2. The apparatus of claim 1 wherein said platen is triangular in shape for providing dual inclined surfaces for accommodating upward and downward exercising movements of said Bourdan tube.

3. The apparatus of claim 2 wherein said manually-operable mechanical means is a control screw,
   said base plate being provided with a threaded opening for receiving said screw.

4. The apparatus of claim 3 wherein:
   said pivotal mounting is provided by a pivot pin and said base plate and said lever arm are slidably-engagable separable parts both provided with registerable openings for receiving said pin, and said lever arm is provided at its outer and with an inwardly-extending notch for slidably receiving and engaging said control screw during said slidable engagement of said separable members.

5. The apparatus of claim 4 wherein said control screw is formed with an expanded head portion and said notch is formed to closely receive said expanded head whereby said control screw engages said lever arm for permitting said screw to pivot the arm in either direction.

* * * * *